United States Patent [19]

Marshall et al.

[11] Patent Number: 4,876,002
[45] Date of Patent: Oct. 24, 1989

[54] REVERSE OSMOSIS WATER PURIFICAITON UNIT
[75] Inventors: John D. Marshall; Thomas N. Mclain, both of Montgomery, Ala.
[73] Assignee: Schlumberger Industries, Inc., Atlanta, Ga.
[21] Appl. No.: 205,751
[22] Filed: Jun. 13, 1988
[51] Int. Cl.$^4$ ............................................. B01D 13/00
[52] U.S. Cl. ................................. 210/136; 210/137; 210/257.2
[58] Field of Search ..................... 210/136, 257.2, 137, 210/652; 137/544, 563, 625.48

[56] References Cited
U.S. PATENT DOCUMENTS 4,176,063 11/1979 Tyler ............................. 210/257.2 X
4,604,194 8/1986 Entingh ......................... 210/257.2 X
4,657,674 4/1987 Burrows ........................ 210/257.2 X Primary Examiner—Frank Spear
Attorney, Agent, or Firm—Dale V. Gaudier; Stephen A. Becker; Robert E. LeBlanc

[57] ABSTRACT

A domestic reverse osmosis water purification system utilizing few parts in the controller valve mechanism enhances reliability and economic feasibility. All surfaces of the controller valve mechanism in contact with water are non-metallic and are constructed of FDA approved materials. In addition to its normal function of metering the reject water flow, the controller valve mechanism allows the homeowner to easily rinse the reverse osmosis membrane and conserves water by automatically stopping influent water flow when the product storage tank is full.

19 Claims, 2 Drawing Sheets

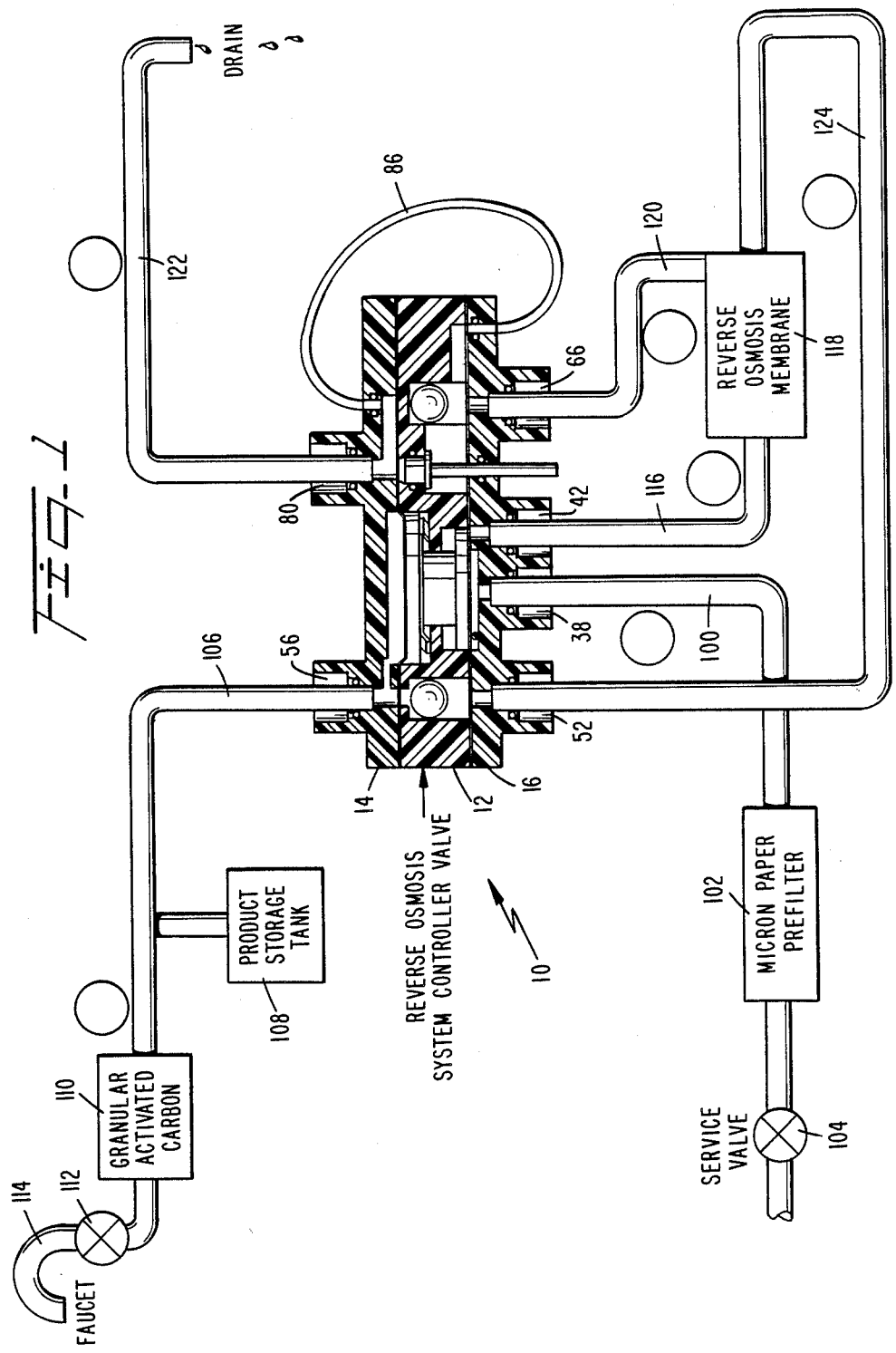

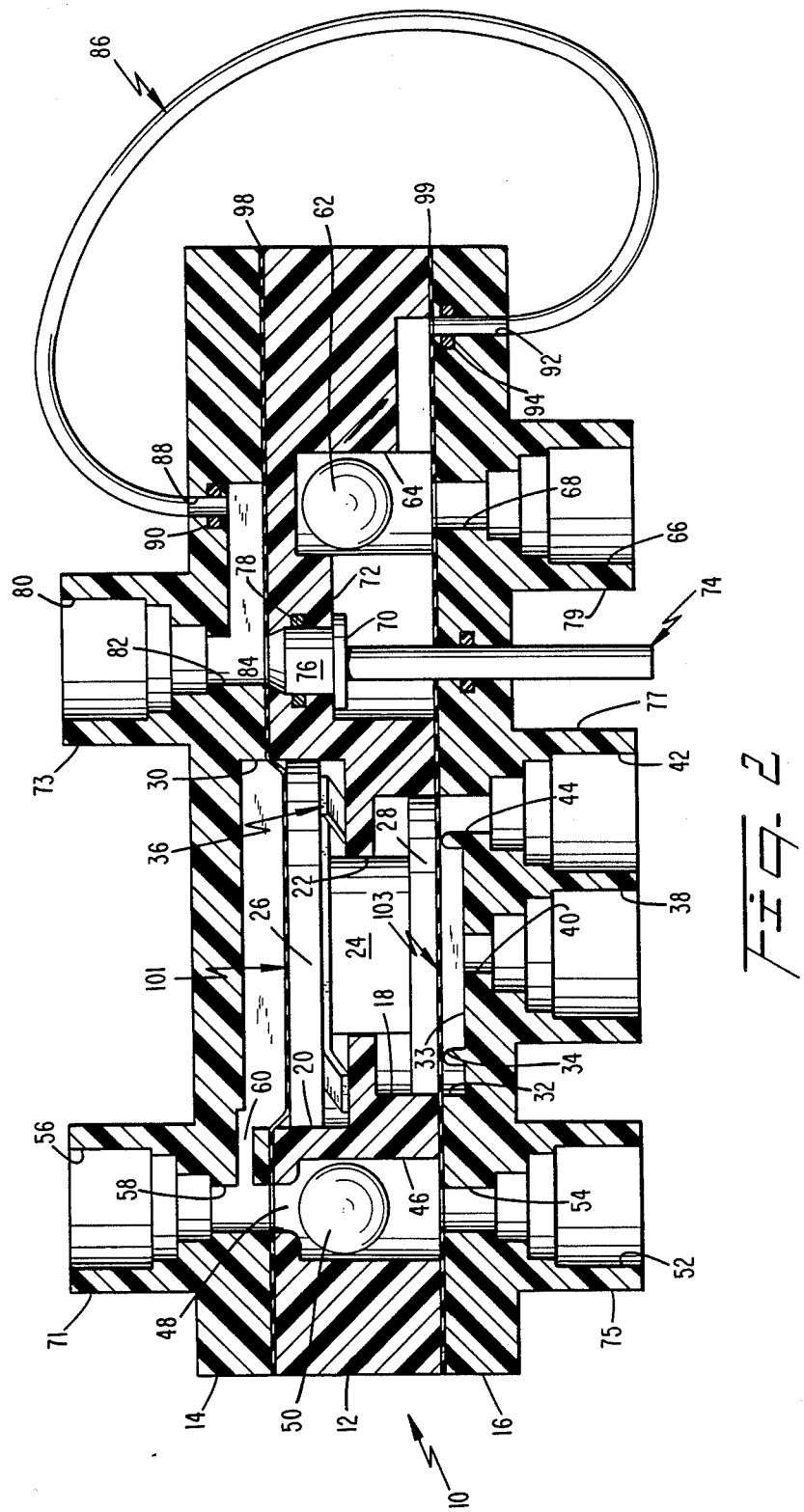

REVERSE OSMOSIS WATER PURIFICAITON UNIT

TECHNICAL FIELD

This invention is directed to a reverse osmosis water purification system utilizing a controller valve having a relatively limited number of parts.

BACKGROUND ART

Reverse osmosis systems for supplying purified water for home use have been proposed wherein a purified water storage container is used with a barrier such as an impermeable flexible diaphragm separating the purified water from pressurized reject water. U.S. Pat. No. 4,176,063 issued to Tyler illustrates such an arrangement. A modified form of the same type system is found in related Tyler U.S. Pat. No. 4,391,712. U.S. Pat. No. 4,657,674 to Burrows also shows an arrangement wherein the purified water storage container is pressurized by reject water separated from the purified water by a membrane of extended area. In the systems shown in all of these patents a thin flexible membrane of large surface area constitutes the only separation between pressurized reject water and purified water. Such an arrangement poses the risk of contamination of the purified product by mass transfer of reject water through the material of the flexible membrane. There is also the danger of contamination through leakage or rupture through the single separating membrane. In addition, such prior systems have tended to rely on relatively complex multipart control valves. A typical control valve is illustrated in the above referenced Tyler patents.

DESCRIPTION OF THE INVENTION

The present invention is directed to a reverse osmosis water purification unit for use in a domestic water supply system of the type wherein a valve controls water flow through a reverse osmosis unit, fresh water storage unit and waste water reject channel. The system automatically shuts off the inlet when the storage tank becomes full and provides a means for manually flushing the membrane when it becomes clogged. All of the valving is centralized in a single control valve unit. The unit is so constructed that all surfaces in contact with water are non-metallic and are formed of FDA approved materials. In addition to the control valve performing its normal function of metering reject flow it also incorporates a manual flush mechanism to allow the homeowner to easily rinse the reverse osmosis membrane. The control valve mechanism may be formed of three synthetic resin plate members which are readily bolted or otherwise fastened together in sandwich fashion with unitary gasket material secured therebetween. All moving parts are mounted within these plates and the number of such parts is very limited.

BRIEF DESCRIPTION OF THE DRAWINGS

FIG. 1 is a diagrammatic view of the reverse osmosis water purification system of the invention; and FIG. 2 is a vertical cross-section of the system control valve embodying features of this invention.

Referring to FIGS. 1 and 2 the control valve mechanism 10 comprises a valve body plate 12 and upper and lower housing plates 14 and 16. The body and housing plates are secured together in fluid tight fashion using suitable gasket material and fastening means such as bolts through the assembled plates and gasket materials. Other fastening means may obviously be utilized.

The valve body plate 12 has in its under surface a first shallow cylindrical cavity 18. Formed in the upper surface of the body plate 12 and overlying and coaxial with the cavity 18 is a second shallow cylindrical cavity 20. The upper cavity 20 is of a larger diameter than the lower cavity 18 and communicates therewith through a central cylindrical cavity or bore 22 in body plate 12.

Mounted in bore 22 for reciprocating vertical movement therein is the central or intermediate portion 24 of a piston assembly. The piston assembly includes an upper piston head or end 26 attached to the intermediate piston 24 and a lower piston head or end 28 also attached to immediate piston portion 24. The upper piston end 26 is slidably received in cavity 20 and the lower piston end 28 is slidably received in cavity 18.

The under side of the upper housing plate 14 has formed therein a shallow cylindrical cavity 30 which is of the same diameter and aligned with the cylindrical cavity 20 in body plate 12. The lower housing plate 16 has formed in its upper surface a shallow cylindrical cavity 32 which aligns with the cavity 18 in body plate 12. The cavity 32 has formed on its lower surface or floor 33 an upstanding coaxial circular rib 34. The downwardly facing surface of piston end 28 of the piston assembly is movable towards engagement with the upper edge of rib 34 when the piston assembly is in its lowermost position as shown in FIG. 2. The piston assembly 24, 26, 28 is urged upwardly in FIG. 2 by means of a circular leaf spring 36 which bears against the floor of the cylindrical cavity 20.

A feed water inlet 38 in the lower housing plate 16 communicates with the shallow cylindrical cavity 32 through an axial bore 40. The bore 40 is substantially centrally disposed with respect to the circular rib 34 and forms a conduit to the space within rib 34. A feed water outlet 42 communicates with the shallow cylindrical cavity 32 at its outer periphery through a bore 44 which opens on the outer diametral side of rib 34.

A downward force may be applied on the piston assembly 24, 26, 28 by virtue of the effect of fluid pressure in upper cavity 30 acting on the upper surface of piston end 26. Upward pressure is applied to the piston assembly 24, 26, 28 by the spring 36 and by fluid pressure applied to the lower pressure surface of the piston end 28. This fluid pressure on the lower pressure surface of piston end 28 consists of the pressure exerted by the fluid within the circular rib 34 when the lower surface of piston end 28 is sealably seated above the circular rib. When the lower surface of piston end 28 moves out of sealing engagement with the rib 34 the fluid pressure on the lower surface of piston end 28 increases to that exerted over the entire area of the lower surface of piston end 28 over the full diameter of the cavity 32.

Referring to FIG. 2 the body plate 12 has at its left side a vertical cylindrical cavity 46 with an axially aligned outlet bore 48 at the upper end thereof. The cavity 46 carries a check ball 50. The lower housing plate 16 provides communication with the body plate cavity 46 through a purified or product water inlet 52 and axial bore 54. The inlet 52 and bore 54 are coaxially aligned with the cylindrical body plate cavity 46 carrying check ball 50. The upper housing plate 14 has a purified water outlet 56 communicating through a coaxial bore 58 with the bore 48 and check ball containing cavity 46 in body plate 12. The bore 58 in upper housing plate 14 is interconnected with the shallow cylindrical cavity 30 in the upper housing plate via horizontal conduit or passage 60.

The body plate 12 carries to the right of the piston assembly a second check ball 62 disposed in a vertical cylindrical cavity 64 which is closed at its upper end. Cylindrical cavity 64 communicates with a reject water inlet 66 in the lower housing plate 16 through a coaxial bore 68.

A manual flush valve is provided by a valve head 70 movably carried in cavity 72 in body plate 12 by a vertical operating rod flush plunger 74 which passes through a suitable bore in lower housing plate 16. The valve head 70 has a reduced diameter plug end 76 which sealingly engages an O-ring 78 carried in a suitable cavity in valve body plate 12 coaxial with the rod 74, valve head 70 and valve plug end 76. Thus a lowering of the flush plunger rod 74 withdraws the plug 76 from sealing engagement and provides communication through the flush valve to a reject water drain outlet 80 in upper housing plate 14 through a vertical coaxial bore 82.

Communicating with the bore 82 in upper housing plate 14 is a horizontally extending cavity or passage 84. The cavity 84 is connected at its right end to a friction tube 86 through a bore 88 and suitable O-ring seal 90. The other end of the friction tube 86 is connected to a similar bore 92 in lower housing plate 16 and sealed thereto by means of an O-ring 94. The tube 86 may be held in place in the bores 88 and 92 in the housing plates 14 and 16 by interference fits between the outside diameter of the tube and the bores in the plates with the O-rings 90 and 94 insuring against leakage. The tube 86 is of a relatively long length and has an inside diameter which is large compared to the equivalent orifice. The tube serves to meter flow through friction loss and is of a diameter large compared to the equivalent orifice required for similar friction.

As previously stated, the housing plates 14 and 16 may be assembled to the body plate 12 by bolting or equivalent means (not shown). Sandwiched between the upper and lower housing plates 14 and 16 and the central body plate 12 are two preferably unitary gasket/diaphragm sheets 98 and 99. These sheets may be punched to form the necessary openings for the various flow passages but are preferably continuous over both upper and lower pressure surfaces 26 and 28 of the piston assembly 24, 26 and 28 as shown at 101 and 103 in FIG. 1. The sheets 98 and 99 are preferably formed of a stretchable impermeable elastomer and/or may be formed of non-toxic rubber. The membrane portions 101 and 103 overlying and underlying the piston assembly 24, 26, 28 double seal the fluid above and below the piston assembly to provide highly reliable isolation of one from the other. The fit between the piston assembly portions and the surrounding cavities thus are not relied upon to perform a sealing function. This permits use of lower tolerance fits between the piston assembly portions 24, 26 and 28 and their surrounding cavity walls to facilitate low cost manufacture of the various parts of the control valve from injection molded synthetic resins. This not only provides a high degree of protection of water purity but also permits high speed production of relatively low cost control valve units.

The upper housing plate 14 may be unitarily molded with all necessary cavities and may include upwardly extending fittings 71 and 73 defining the outlet 56 and outlet 80. The lower housing plate 16 may be similarly molded with fittings 75, 77 and 79 defining inlet 52, inlet 38, outlet 42 and inlet 66. The body plate 12 may also be molded in finished form. Suitable O-rings and gaskets may be provided at all openings and are easily assembled before the various plates are fastened together in the illustrated sandwich fashion. It will be appreciated that the only moving parts in the control valve mechanism are the check balls, the piston assembly and the flush plunger. As a result the operation of the mechanism is relatively trouble free and well suited to domestic application. The control valve mechanism may be provided in a single module of small size wherein no adjustments are necessary after the length of the friction tube is determined.

It will be seen that the movable members in the control valving mechanism 10 are each mounted or arranged for rectilinear movement along an axis. These axes are substantially parallel and spaced one from the other so that the valves are disposed in a general side-by-side relationship. This arrangement contributes to the compact form of the control valve as well as to its simplicity. It will be appreciated that while the various valves illustrated in FIG. 2 are disposed side-by-side in a row they also may be disposed in a side-by-side grouped or clustered arrangement which does not necessarily form a row.

Referring to FIG. 1 the control valve 10 is illustrated connected in a reverse osmosis water purification system according to the invention. In that figure it may be seen that the control valve feed water inlet 38 is connected through conduit 100 to a five micron paper pre-filter 102 and service valve 104. The service valve 104 may be connected to a potable water feed water supply (not shown). The control valve purified water outlet 56 is connected through a conduit 106 to a purified water storage tank 108 and thence to a granular activated carbon filter 110. The carbon filter is in turn connected through a faucet 112 to a spigot 114. The purified water storage tank 108 has an internal air bag that increases in pressure as purified product water displaces air bag volume in a manner known to those skilled in the art.

The control valve feed water outlet 42 is connected through conduit 116 to the feed water inlet of a reverse osmosis membrane canister 118. The reject water outlet from the reverse osmosis canister 118 is connected through conduit 120 to the control valve reject water inlet 66. The control valve reject water outlet 80 is connected through conduit 122 to a suitable drain. The purified water outlet from the reverse osmosis canister 118 is connected through conduit 124 to the control valve purified water inlet 52.

The operation of the system is as follows:

Unpurified feed water enters the system at service line pressure through service valve 104 and the five micron paper pre-filter 102. Influent feed water from the five micron paper pre-filter enters the control valve 10 through conduit 100 and feed water inlet 38 at near service line pressure. It will be noted that the water is contained by the diaphragm 103 and does not reach the piston assembly pressure surface 101.

If pressure on the upper piston assembly pressure surface 26 is insufficient to overcome pressure on the lower piston assembly pressure surface 28 plus the force applied by the spring 36, then influent feed water from feed water conduit 100 enters inlet 38 and bore 40, crosses over circular rib 34 and exits the valve through bore 44 and outlet 42. Such influent feed water then travels through conduit 116 to the feed water inlet of reverse osmosis membrane canister 118 at near service line pressure.

Reject water (concentrate) which passes over and washes the reverse osmosis membrane exits the reject water outlet of reverse osmosis canister 118 through conduit 120 and enters the controller valve reject water inlet 66 also at near service line pressure. This reject water first passes check ball 62 which eliminates any backfeed from and through drain conduit 122. After passing the check ball 62 the reject water passes through the long friction tube 86. This tube serves to meter reject water flow through friction loss control. The reject water flow rate can be adjusted by varying the length of the tube 86 thereby varying associated friction loss. The inside diameter of tube 86 is large compared to the equivalent orifice required for similar friction. This larger inside diameter allows solids that were not trapped by the five micron paper pre-filter 102 or that were precipitated out by the reverse osmosis membrane to easily pass through to the drain. After reject water is metered through the tube 86 it then passes out through cavity 84, bore 82, outlet 80 and conduit 122 to the drain.

Manual flush plunger 74 may be pulled by hand to disengage the plug end 76 from O-ring 78 in body plate 12 to allow reject water to bypass friction tube 86 and pass through O-ring 78, bore 82, outlet 80 and conduit 122 to the drain. The large inside diameter of the O-ring and its associated bore offers little resistance to the flow. This procedure permits manual creation of a high flow rate of feed water in the reverse osmosis canister resulting in a high velocity at the surface of the membrane material in order to flush deposits of particles and dissolved solids. The frequency of this procedure will vary depending upon the accumulation rate of such deposits and/or influent feed water quality. The nature of the manual flush valve using plug end 76 frictionally fitting within O-ring 78 makes it possible to provide a reliable fluid seal while using easily manufactured low cost parts formed of synthetic resin.

Purified water which has passed through the reverse osmosis membrane in the canister 118 leaves the canister purified water outlet through conduit 124 at a low flow rate and low pressure. The pressure drop from the influent feed water conduit 116 to purified water output conduit 124 drives the product water through the membrane. The purified product water flows through conduit 124 to the controller valve inlet 52. This water then passes through bore 54 and around check ball 50 and exits through bore 48, bore 58, outlet 56, conduit 106 to the storage tank 108. As stated, the storage tank has an internal air bag that increases in pressure as purified product water displaces air bag volume. If the faucet 112 is closed, the pressure in the storage tank 108 and conduit 106 increases until the pressure acting on the upper piston pressure surface 26 of piston assembly 24, 26, 28 is large enough to cause the piston assembly to move downwardly to seal against the circular rib 34. As reject water continues to pass through line conduit 122 to the drain, the pressure in conduits 116, 120, 122 and 124 decreases.

It will be seen that the purified product water is sealed from the face of the piston assembly 24, 26, and 28 by the diaphragm 101. At the same time the purified feed water is sealed from the piston assembly 24, 26 and 28 by diaphragm 103 on the opposite side of the piston assembly. The piston assembly itself is completely sealed and the unpurified feed water and purified effluent water are totally separated to prevent any leakage therebetween. This arrangement greatly reduces the possibility of contamination through membrane leakage as sometimes may occur where feed water or reject water is separated from the purified product water by a single membrane. According to the invention the reject water is completely isolated from the purified product water at all stages.

As the conduit pressures decrease to atmospheric pressure, a small amount of water will backflush through product water conduit 124 and the reverse osmosis membrane allowing check ball 50 to seat against bore 54 above purified water inlet 52 in lower housing plate 16. At this point there is equal atmospheric pressure on both sides of the reverse osmosis membrane. As pressure in conduit 116 decreases to atmospheric pressure and the piston surface 28 of piston assembly 24, 26, 28 is seated against circular rib 34, the effective piston area contacted by line pressure is decreased to the area inside of circular rib 34. All flow through the unit thus ceases. When the faucet 112 is opened to allow flow from the storage tank 108 the pressure on the upper piston pressure surface 26 of piston assembly 24, 26, 28 will also decrease. When the pressure on this surface decreases sufficiently the piston assembly 24, 26, 28 is moved up by the influent feed water line pressure against the effective piston area within circular rib 34 plus the force of spring 36. The piston assembly 24, 26, 28 then moves upwardly to open the influent feed water passage and the process repeats.

The control valve utilized in the system may be produced in small size at a relatively low cost. All parts of the valve which are in contact with the water may be formed of FDA approved synthetic resins. Further, the unique isolation of the influent unpurified feed water from the outflowing purified product water and the complete isolation of product water from reject water provides significant advantages in insuring product purity. The flush valve similarly is of a design which permits economic manufacture of FDA approved materials and permits periodic manual flushing to maintain high efficiency of the purification process. The entire control valve unit may be provided in small size with few moving parts.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for purifying, storing and dispensing feed water which is derived from a supply of unpurified water containing undesired components and having an elevated hydraulic pressure, including a reverse osmosis water purification means containing a semipermeable membrane and having a feed water inlet for introduction of pressurized unpurified feed water thereinto, a purified water outlet for purified product water produced by said reverse osmosis means and a reject water outlet, a purified water storage tank and means for pressurizing water stored therein, dispensing valve means for dispensing purified water under hydraulic pressure, drain conduit means for draining reject water, and control valving means, said control valving means being unitarily housed by a body plate having a pair of substantially planar surfaces, an upper housing plate and a lower housing plate with said housing plates being assembled together in sandwich fashion, said control valving means including:

first valve means for controlling flow of unpurified feed water under pressure to the feed water inlet of said reverse osmosis means;

second valve means for controlling the flow of reject water from said reject water outlet of said reverse osmosis means to said drain conduit means;

third valve means for controlling the flow of purified water from said purified water outlet of said reverse osmosis means to said purified water storage tank under pressure;

said first valve means including a piston assembly movably mounted in said control valving means; said piston assembly being movable between a first position wherein said first valve means is opened to conduct unpurified feed water to the feed water inlet of said reverse osmosis means and a second position wherein said first valve means is closed to prevent feed water flow from said unpurified feed water supply to said reverse osmosis means feed water inlet;

said piston assembly having a first pressure surface connected to said purified water storage tank and a second piston assembly pressure surface connected to said supply of unpurified feed water, and membrane means associated with said piston assembly isolating the purified water connected to said first piston assembly pressure surface from the unpurified feed water connected to said second piston assembly pressure surface.

2. An apparatus according to claim 1 including conduit means external to said control valving means connected to conduct reject water which has passed through said second valve means to said drain conduit means; said conduit means including means for metering the rate of flow of reject water therethrough.

3. An apparatus according to claim 2 wherein said conduit means comprises an elongated tube having a diameter larger than the diameter of an orifice which would permit an equivalent rate of flow.

4. An apparatus according to claim 1 wherein said control valving means includes fourth manual flush valve means connected to the reject water outlet of said reverse osmosis means through said second valve means and connected to said drain conduit means to receive water which flows through said second valve means and to output such water at a relatively high rate to said drain conduit means when said flush valve means is open; said flush valve means having an operating member extending external of said control valving means for manually opening and closing said flush valve means.

5. An apparatus according to claim 1 wherein said control valving means includes fourth valve means for flushing feed water from the feed water inlet of said reverse osmosis means through the reverse osmosis means to the reject water outlet thereof and thence through said fourth valve means to said drain conduit means; said second and third valve means comprising check ball valve means; said check ball valve means in said third valve means acting to prevent flow of purified water from said storage tank past said check ball; said check ball means in said second valve means acting to prevent water flow into the reject water outlet of said reverse osmosis means; and including friction tube means external of said control valving means connecting the reject water outlet of said reverse osmosis means and the drain conduit means through said second valve means when said second valve means is open.

6. An apparatus according to claim 1 wherein said membrane means comprises a pair of spaced generally parallel membranes disposed across the first and second pressure surfaces of said piston assembly.

7. An apparatus according to claim 1 wherein said control valve mechanism includes a body plate, an upper housing plate and a lower housing plate; said piston assembly being reciprocably mounted within said body plate for movement perpendicular to the planar surfaces thereof; said piston assembly having a first cylindrical piston end carrying said first pressure surface and a second spaced cylindrical piston end carrying said second pressure surface; said piston ends being carried by an intermediate cylindrical piston portion; spring means in said body plate spring biasing said first piston end in a direction to resist pressure on said first pressure surface; said first piston end and said second piston end being of different diameters with said first piston end being of a larger diameter than said second piston end.

8. An apparatus according to claim 7 wherein said first and second pressure surfaces on said first and second piston ends are covered by membrane means sandwiched between said upper housing plate and said body plate and said lower housing plate and said body plate.

9. An apparatus according to claim 7 wherein said first piston end moves in a first cylindrical cavity formed in said body plate and said second piston end moves in a second cylindrical cavity formed in said body plate and said intermediate portion of said piston assembly moves in a third cylindrical cavity formed in said body plate between said first and second cavities; said cavities being of different diameters; said spring means being disposed between said first piston end and the floor of said first cavity in said body plate.

10. An apparatus according to claim 9 wherein said lower housing plate includes a cylindrical cavity aligned with the second cylindrical cavity in said body plate in which said second piston end reciprocates; an upstanding circular rib extending from the floor of the cylindrical cavity in said lower housing plate concentric with said first and second piston ends; said first valve means including a first fluid connection to the space defined by the interior of said rib and a second fluid connection to the space defined between the exterior of the rib and the peripheries of the second cavity and the cavity in said lower housing plate; said first valve means being actuated between an open and closed condition by movement of said second piston head toward and away from said rib to permit or prevent flow of feed water through said first fluid connection into said second cavity and across said rib and out of said second fluid connection into said unpurified feed water inlet of said reverse osmosis means.

11. An apparatus according to claim 10 wherein said control valving means includes fourth manual flush valve means connected to the reject water outlet of said reverse osmosis means through said second valve means and connected to said drain conduit means to receive water which flows through said second valve means and to output such water at a relatively high rate to said drain conduit means when said flush valve means is open; said flush valve means having an operating member extending external of said control valving means for opening and closing said flush valve means.

12. An apparatus according to claim 11 wherein said body plate includes a second valve means cavity in which said check ball for said second valve means moves, a first flush valve means cavity and a second flush valve means cavity connected to said first flush valve means cavity and to said second valve means cavity; said flush valve including plug means receivable in said first flush valve means cavity to close said flush valve means; said operating member being connected to said plug means for moving said plug means into and out of sealing engagement with said first flush valve means cavity to open and close said flush valve means.

13. An apparatus according to claim 12 wherein said upper housing plate includes a cavity connected to the first flush valve cavity and said body plate includes a cavity connected to the second valve means cavity; and friction tube means external of said control valving means, said friction tube means being connected to said upper and lower housing plates and to said cavity in said upper housing plate connected to said flush valve cavity; said friction tube means permitting flow of reject water from said reverse osmosis means through said second valve means, through said friction tube means and into said cavity in said upper housing plate connected to said flush valve cavity and thence to said drain conduit means.

14. An apparatus according to claim 13 wherein the means for pressurizing the storage tank comprises an air bag.

15. A control valve mechanism for a reverse osmosis water purifying system comprising:
(a) a body plate having a pair of substantially parallel planar surfaces; an upper housing plate having at least one planar surface; a lower housing plate having at least one planar surface; said body plate and upper and lower housing plates being assembled together in sandwich fashion with their planar surfaces in facing disposition;
(b) first valve means within said sandwiched plates; said first valve means comprising:
 (i) piston means having an upper piston end of a first diameter, a lower piston end of a second smaller diameter and an intermediate piston portion of still smaller diameter joining the piston ends; said piston ends and intermediate portion being coaxially aligned on an axis substantially perpendicular to said planar surfaces;
 (ii) a first cylindrical cavity in said body plate receiving said upper piston end for reciprocable motion therein; a second cylindrical cavity in said body plate coaxial with said first cavity receiving said lower piston end for reciprocable motion therein; and a third cylindrical cavity in said body plate coaxial with and connecting said first and second cavities and receiving said intermediate piston portion for reciprocable motion therein; said piston ends having end surfaces which are substantially parallel to said planar surfaces; spring means disposed between said upper piston end and the floor of said first cavity in said body plate; said spring means urging said piston assembly towards said upper housing plate;
 (iii) said housing plate having a cylindrical cavity overlying said first cavity in said body plate and being of substantially the same diameter and coaxially aligned therewith;
 (iv) said lower housing plate having a cylindrical cavity underlying said second cavity in said body plate and being of substantially the same diameter and coaxially aligned therewith;
 (v) said cylindrical cavity in said lower housing plate having a floor generally perpendicular to the axis of said cylindrical cavity;
 (vi) a circular rib extending upward from said floor to the substantially planar surface of said lower housing plate;
 (vii) said lower housing plate having a first port providing communication with said cylindrical cavity within the periphery of said rib and a second port providing communication with said cylindrical cavity outside the periphery of said rib;
(c) second valving means within said sandwiched plates comprising:
 (i) first check ball means carried by said body plate within a cylindrical check ball cavity having an axis substantially parallel to the axis of said piston assembly;
 (ii) a port in said upper housing plate communicating with said cylindrical check ball cavity in said body plate;
 (iii) a port in said lower housing plate communicating with said cylindrical check ball cavity in said body plate;
 (iv) said upper housing plate having passage means extending from said port communicating with said cylindrical check ball cavity in said body plate; said passage means providing communication between said port and said cylindrical cavity in said upper housing plate overlying said first cavity in said body plate;
(d) third valve means within said sandwiched plates comprising:
 (i) second check ball means carried by said body plate in a cylindrical check ball cavity having an axis substantially parallel to the axis of said piston assembly;
 (ii) port means in said lower housing plate communicating with said cylindrical check ball cavity in said body plate;
 (iii) said lower housing plate having a first tube port therein communicating with said cylindrical check ball cavity in said body plate;
 (iv) said upper housing plate having an effluent cavity therein facing said body plate and having a second tube port connected to said effluent cavity;
(e) fourth valve means within said sandwiched plates comprising:
 (i) a flush valve including a rectilinear operating member extending through an aperture in said lower housing plate; a plug end mounted at the upper end of said operating member and received in a cylindrical flush cavity in said body plate for reciprocating motion into and out of said cavity; said body plate having passage means interconnecting said flush cavity and said cylindrical check ball cavity for said second check ball means.

16. A control valve mechanism according to claim 15 including an impermeable membrane sandwiched between said upper housing plate and said body plate across said first cylindrical cavity in said body plate; and a second impermeable membrane sandwiched between said lower housing plate and said body plate across said second cylindrical cavity in said body plate to seal said piston assembly between said membranes.

17. An apparatus for purifying, storing and dispensing feed water derived from a pressurized source including a reverse osmosis water purification means having a feed water inlet for introduction of pressurized unpurified feed water thereinto, a purified water outlet for purified product water produced by said reverse osmosis means and a reject water outlet, a purified water storage tank with means for pressurizing water stored therein, dispensing valve means for dispensing purified water, drain conduit means for draining reject water, and control valving means being unitarily housed by a body plate having a pair of substantially planar surfaces, an upper housing plate and a lower housing plate with said housing plates being assembled together in sandwich fashion, said control valving means including:

first valve means for controlling flow of unpurified feed water under pressure to the feed water inlet of said reverse osmosis means, said first valve means including a first member mounted for rectilinear movement on a first axis;

second valve means for controlling the flow of reject water from said reject water outlet of said reverse osmosis means to said drain conduit means, said second valve means including a second member mounted for rectilinear movement along a second axis;

third valve means for controlling the flow of purified water from said purified water outlet of said reverse osmosis means to said purified water storage tank under pressure, said third valve means including a third member mounted for rectilinear movement along a third axis;

fourth valve means for controlling the flow of flush feed water through the reverse osmosis means at a high rate to flush same, said fourth valve means including a fourth member mounted for rectilinear movement along a fourth axis;

said member mounted for rectilinear movement in said first valve means comprising a piston assembly mounted for reciprocating movement between a first position wherein said first valve means is opened to conduct unpurified feed water to the feed water inlet of said reverse osmosis means and a second position wherein said first valve means is closed to prevent feed water flow from said unpurified feed water supply to said reverse osmosis means feed water inlet;

said piston assembly having a first pressure surface connected to said purified water storage tank and a second piston pressure surface connected to said supply of unpurified feed water and membrane means associated with said piston assembly isolating the purified water connected to said first piston assembly pressure surface from the unpurified feed water connected to said piston assembly to said second piston assembly piston surface.

18. An apparatus according to claim 17 wherein said first, second, third and fourth axes are spaced and said first, second, third and fourth valve means are disposed in side by side relationship.

19. An apparatus according to claim 17 including a friction tube connected between the inlet and outlet of said second valve means.

* * * * *